United States Patent
Tokunaga et al.

(10) Patent No.: US 6,643,152 B2
(45) Date of Patent: Nov. 4, 2003

(54) DC POWER SUPPLY DEVICE

(75) Inventors: Norikazu Tokunaga, Hitachi (JP); Kenichi Onda, Hitachi (JP); Takeshi Onaka, Hitachi (JP); Satoru Masuyama, Odawara (JP); Ryouhei Saga, Takasaki (JP); Katsunori Hayashi, Odawara (JP)

(73) Assignees: Hitachi, Ltd., Tokyo (JP); Hitachi Computer Peripherals Co., Ltd., Kanagawa (JP); Hitachi Tohbu Semiconductor, Ltd., Gunma (JP)

( * ) Notice: Subject to any disclaimer, the term of this patent is extended or adjusted under 35 U.S.C. 154(b) by 0 days.

(21) Appl. No.: 10/292,542

(22) Filed: Nov. 13, 2002

(65) Prior Publication Data

US 2003/0107906 A1 Jun. 12, 2003

Related U.S. Application Data

(63) Continuation of application No. 09/984,971, filed on Oct. 31, 2001, now Pat. No. 6,507,507.

(30) Foreign Application Priority Data

Dec. 6, 2000 (JP) ......................................... 2000-371207

(51) Int. Cl.[7] .............................................. H02M 7/04
(52) U.S. Cl. .......................................... 363/89; 307/64
(58) Field of Search ............................. 363/74, 78, 84, 363/89, 125; 307/64, 66, 80, 82

(56) References Cited

U.S. PATENT DOCUMENTS

| | | | | |
|---|---|---|---|---|
| 5,631,814 A | * | 5/1997 | Zak | 363/37 |
| 5,781,422 A | * | 7/1998 | Lavin et al. | 363/37 |
| 5,832,281 A | * | 11/1998 | Maeda | 713/300 |
| 5,982,645 A | * | 11/1999 | Levran et al. | 363/37 |
| 6,037,756 A | * | 3/2000 | Pong | 323/222 |
| 6,175,217 B1 | * | 1/2001 | Da Ponte et al. | 322/19 |
| 6,507,507 B2 | * | 1/2003 | Tokunaga et al. | 363/89 |

FOREIGN PATENT DOCUMENTS

JP    2000-116029    4/2000

* cited by examiner

*Primary Examiner*—Adolf D. Berhane
(74) *Attorney, Agent, or Firm*—Crowell & Moring LLP

(57) ABSTRACT

A DC power supply device comprises an AC/DC converter 1, a DC/DC converter 2, and a DC converter 3 converting DC power from a battery 4 to DC voltage for connecting to output terminals of the AC/DC converter. The DC power supply device is provided with a controlling circuit 100 which observes a charging control level and a load sharing level, impresses a charging command on a UPS controlling part controlling the DC converter, and simultaneously provides a PFC controlling part controlling the AC/DC converter with a current command when a voltage level is less than the charging control level, stops only the charging command when the voltage level is more than the charging level and less than the load sharing level, and provides the UPS controlling part and the PFC controlling part with current commands when the voltage level is more than the load sharing level. The AC/DC converter and the DC converter supply power in parallel when a load is more than a prescribed value, and the DC converter supplies power as a backup when a trouble is present in an AC power input.

9 Claims, 8 Drawing Sheets

DC POWER SUPPLY DEVICE

This application is a continuation of application Ser. No. 09/984,971, filed Oct. 31, 2001 new U.S. Pat. No. 6,507,507.

BACKGROUND OF THE INVENTION

1. Field of the Invention

The present invention relates to a DC power supply device for an electronic device and, particularly to a technology for sharing to supply power from a battery according to a power interruption of AC input or a loading state.

2. Description of Prior Art

Conventionally, a power supply for an information device such as a disk array is constituted such that power is supplied from a commercial AC input, an AC/DC converter converts the input into DC power, and a DC/DC converter converts the DC power to a DC voltage required for a load inside the information device again. In this type of inboard power supply, the AC/DC converters and the DC/DC converters operate redundantly in parallel for increasing reliability.

Also a power supply constitution where an uninterruptible power supply (UPS) is attached externally or a constitution where an input of the AC/DC converter receives two systems of AC are adopted.

Japanese Laid-open Patent Application No. 2000-116029 JP A 2000-116029) (Japanese Patent Application No. 10-280829) discloses a backup power supply device supplying power from a battery when AC power supply is interrupted. The power supply constitution adopts a circuit constitution where a diode is serially connected to a power factor improving circuit conducting AC/DC conversion, and a diode is serially connected to a backup converter from a battery, and then both of the diodes are connected in parallel. Output voltage from the backup converter is set to lower than output voltage of the power factor improving circuit, and either the power factor improving circuit or the backup circuit supplies power to a load, thereby integrating a UPS feature into a device power supply, resulting in improving reliability of the power supply device in case of a trouble of the AC power supply.

SUMMARY OF THE INVENTION

Problem to be Solved by the Invention

The conventional power supply constitution where an external UPS is connected degrades the conversion efficiency because there are two stages of power conversion in the UPS during normal operation, and further there is an AC/DC converter for converting AC power to DC power in a communication/information device, resulting in requiring three stages of power conversion. Also the converters providing redundant features are constituted by connecting them in multiple stages, there is a problem that the volume of the power supply device becomes large, and the cost increases.

As communication/information devices have diversified, a power supply is required to meet a wide range of input, since a user selects a device without caring the input voltage. However, if an external UPS is connected, the input/output specification is fixed, and there is a problem that a power supply whose input voltage specification meets a user environment should be selected.

Though the power supply constitution in the Japanese application patent laid-open publication described before allows reducing the size and the cost compared with the one provided with an external UPS, the maximum power required for the DC/DC converter is supplied from the backup converter when the AC power supply has a trouble, and from the power factor improving circuit which conducts AC/DC conversion when in a normal state. Thus, both the backup converter and the power factor improving circuit should have a capability supplying the maximum power which a load requires, resulting in problems of increased volume, size and cost of the device.

An object of the present invention is to provide a DC power supply device which improves power conversion efficiency as the entire power supply device, saves space, reduces the cost, and does not present a power interruption or a momentary power failure.

Means for Solving the Problems

To attain the object as mentioned above, a DC power supply device comprising, an AC/DC converter which converts a commercial AC input to DC voltage, a DC/DC converter which converts output power of the AC/DC converter into load voltage, and a DC converter converting DC power from a battery to DC voltage corresponding to the output of the AC/DC converter to connect to output terminals of the AC/DC converter is provided, and the DC power supply device is provided with a control circuit which controls the output voltage of the AC/DC converter and the output voltage of the DC converter to prescribed values, the AC/DC converter and the DC converter supply power in parallel when a load is more than a prescribed value, and the DC converter supplies power as a backup when a trouble is present in the AC power input.

The control circuit is provided with a voltage control circuit which controls the output voltage of the AC/DC converter to a prescribed value, a current command circuit which forms a current command for the AC/DC converter, a PFC controlling part which controls the AC/DC converter, a UPS controlling part which controls the DC converter to conduct a prescribed operation, a voltage level detecting circuit, and a current calculating circuit, and controls the current command circuit, the PFC controlling part, and the UPS controlling part according to outputs from the voltage level detecting circuit and the current calculating circuit, thereby operating the AC/DC converter and the DC converter. The control circuit is further provided with an AC power interruption detecting circuit, and the AC power interruption detecting circuit simultaneously uses a power interruption detection in the AC input, and a power interruption detection by comparing the current command from the AC/DC converter and an actual detected current, and impresses a power interruption signal on the voltage level detecting circuit when a power interruption is detected.

DETAILED DESCRIPTION OF EMBODIMENTS OF THE INVENTION

Figure 1:
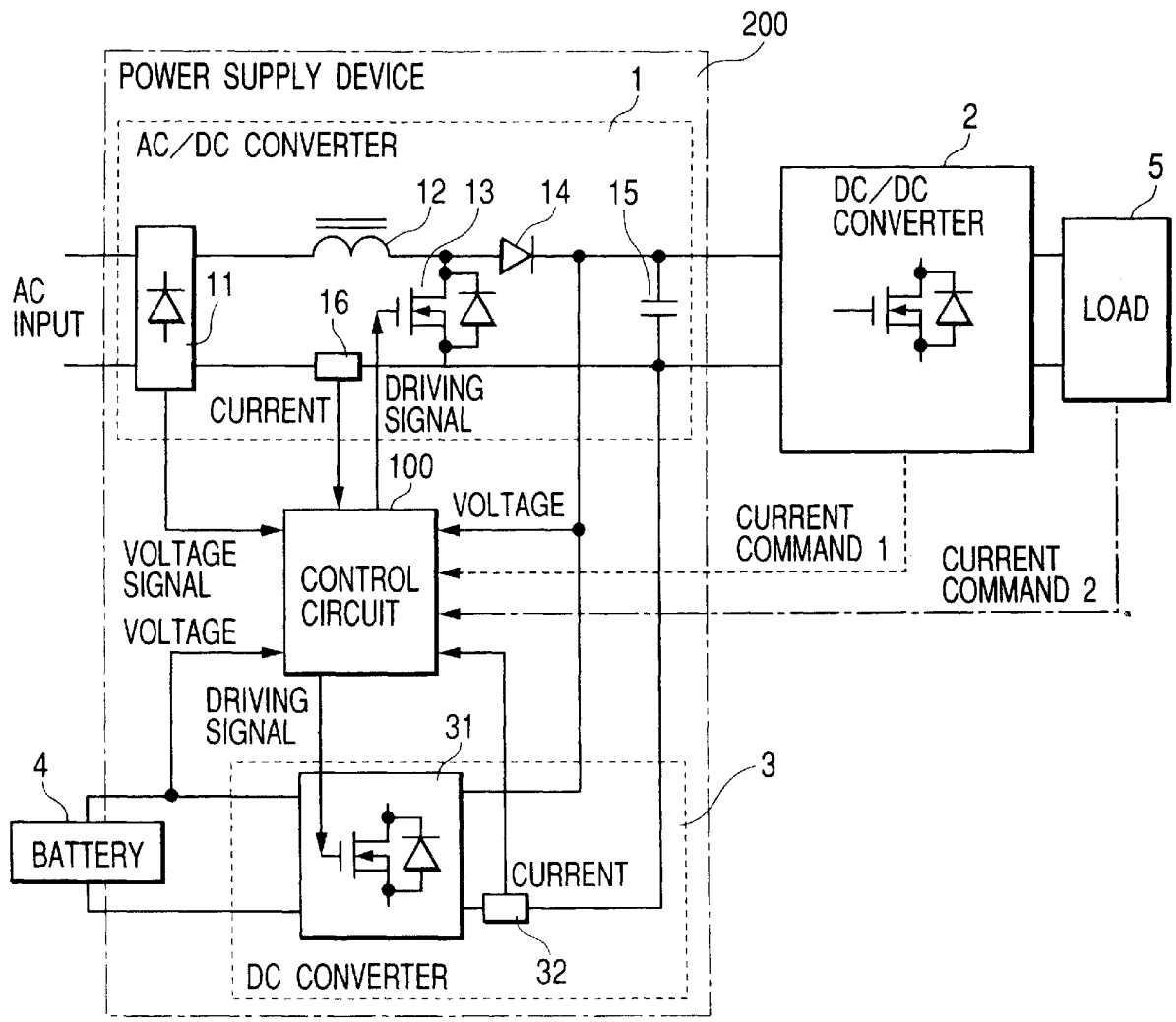
FIG. 1 is a constitution diagram of a DC power supply device of an embodiment of the present invention.

Embodiments of the present invention will be described hereunder, referring to the drawings.

FIG. 1 presents a constitution of a DC power supply device of an embodiment of the present invention. In FIG. 1, 200 is a power supply device, 2 is a DC/DC converter, and 5 is a load. The power supply device 200 comprises an AC/DC converter 1, a DC converter 3, a battery 4, and a controlling circuit 100. The AC/DC converter 1 is a main circuit which comprises a rectifying circuit 11, a reactor 12, a switching element 13, a diode 14, a capacitor 15, and a current detecting circuit 16, has a power factor improving feature, receives a commercial AC input, and provides a prescribed DC voltage controlled by the control circuit 100. The DC converter 3 comprises a main circuit 31, and a current detecting circuit 32, is controlled by the control circuit 100, and provides/receives DC power between the battery 4 and the capacitor 15.

Figure 2:
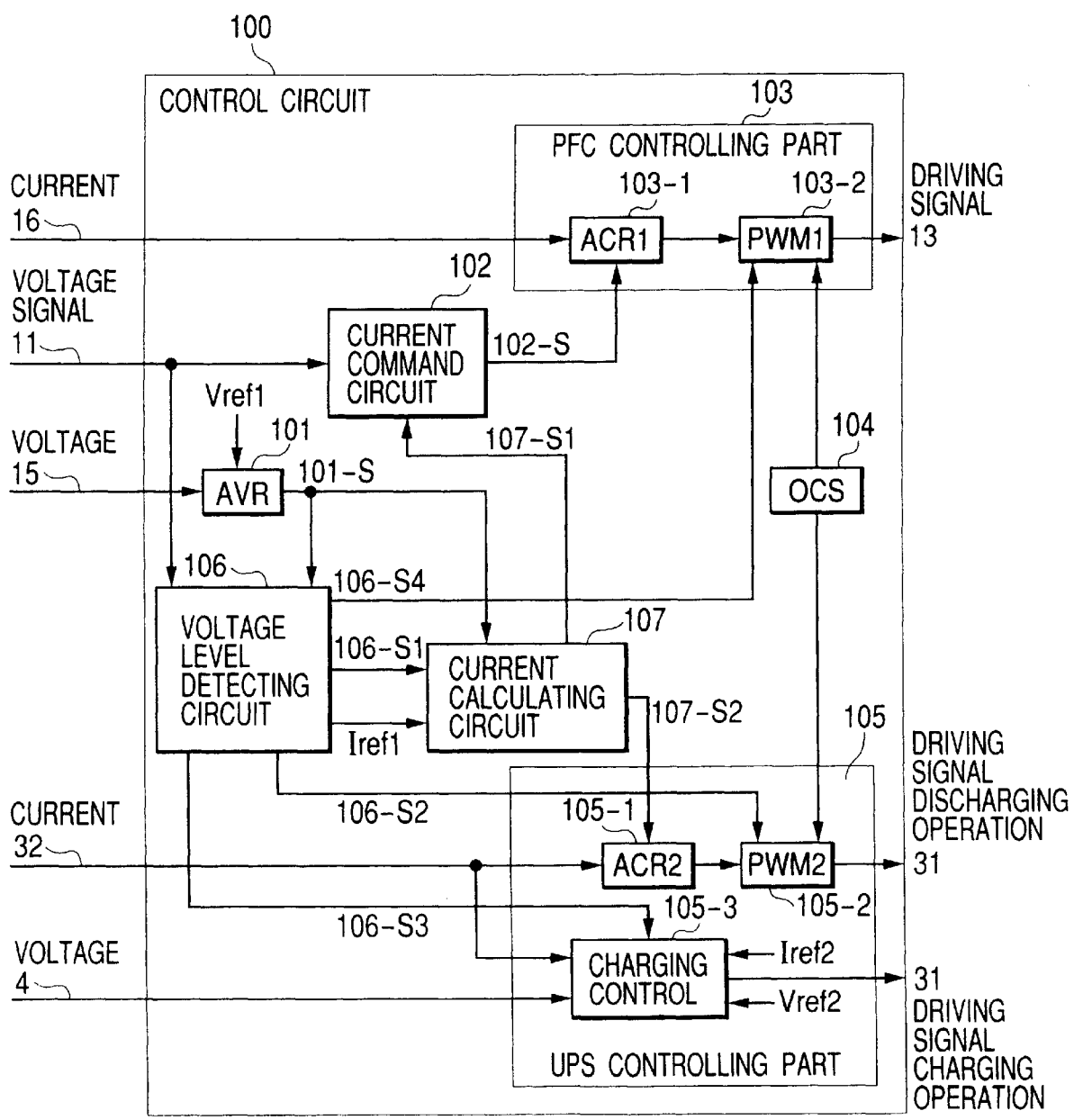
FIG. 2 is a detailed constitution diagram of a control circuit of the present invention.

FIG. 2 describes the detail of the control circuit 100 of the DC power supply device of the present embodiment. The control circuit 100 comprises a voltage control circuit (AVR) 101, a current command circuit 102, a PFC controlling part 103, a oscillating circuit (OSC) 104, a UPS controlling part 105, a voltage level detecting circuit 106, and a current calculating circuit 107. The PFC controlling part 103 comprises a current control circuit (ACR1) 103-1, and a driving signal forming circuit (PWM1) 103-2. The UPS controlling part 105 comprises a current control circuit (ACR2) 105-1, a driving signal forming circuit (PWM2) 105-2, and a charging control 105-3. The control circuit 100 controls both the AC/DC converter and the DC converter 3, thereby supplying DC/DC converter 2 for a load with stable DC power.

Figure 3:
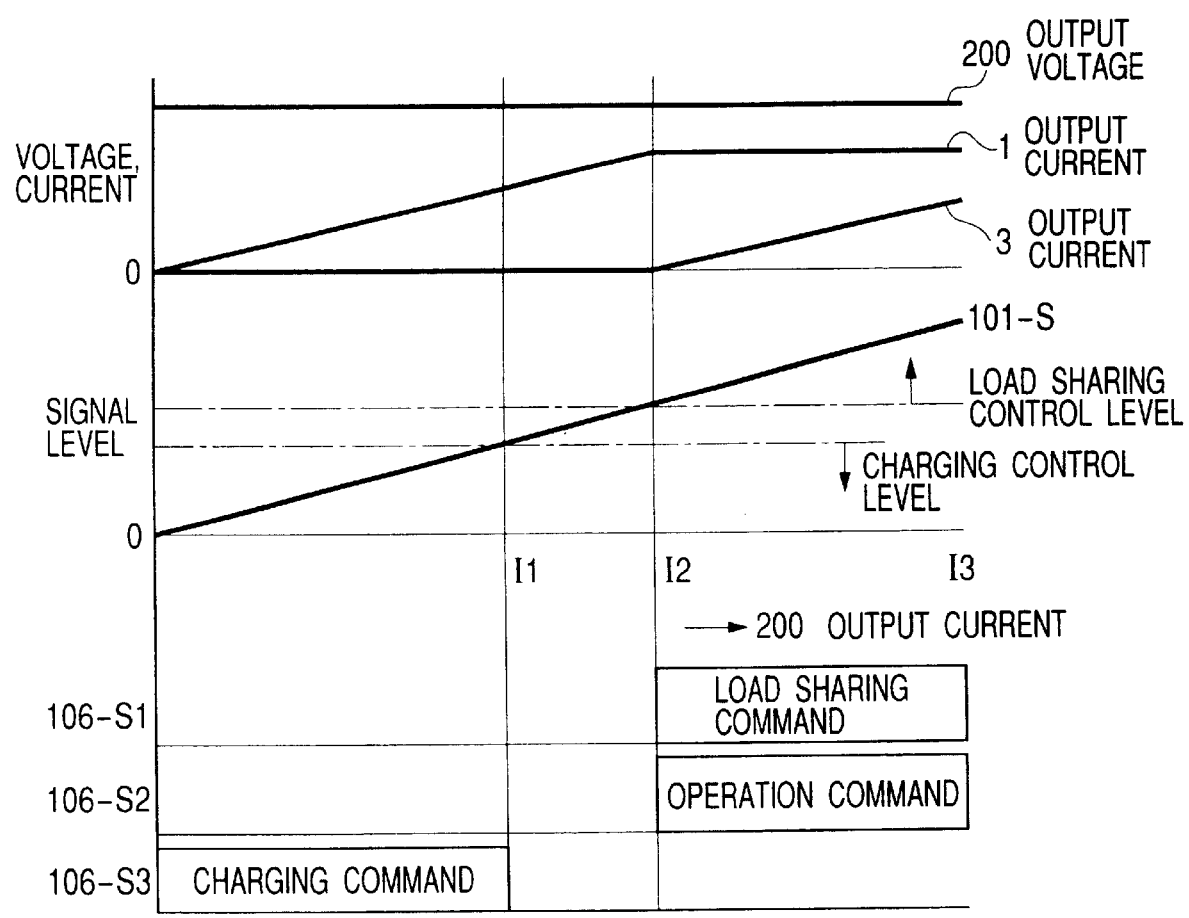
FIG. 3 is a figure showing the operation of the control circuit of the present invention.

FIG. 3 describes an operation of the present embodiment when the AC input is normal. FIG. 3 is a figure describing an operation indicating the relationship among the output voltage of a power supply device 200 (200 Output voltage), the output current of the AC/DC converter 1 (1 Output current), the output current of the DC converter 3 (3 Output current), and signals of the individual elements.

The voltage control circuit (AVR) 101 detects voltage of the capacitor 15 (15 Voltage), compares it with a reference voltage Vref1 to form a signal 101-S for control, and impresses the signal on the voltage level detecting circuit 106 and the current calculating circuit 107. The voltage level detecting circuit 106 observes in which area the signal 101-S exists with respect to a charging control level and a load sharing level, and provides a corresponding signal. When the signal 101-S is in a period of the charging control level area (a the load state where the 200 Output current is from 0 to I1), a load sharing command 106-S1 provided for the current calculating circuit 107, and an operation command 106-S2 provided for the PWM2 105-2 are off, and a charging command 106-S3 is impressed on a charging control 105-3, and an operation command 106-S4 is impressed on the PWM1 103-2. The current calculating circuit 107 provides the current command circuit 102 with the signal 101-S as a signal 107-S1, and provides the ACR2 105-1 with the signal 101-S as a signal 107-S2. The current command circuit 102 forms a current command value 102-S for the AC/DC converter 1 from the signal 107-S1 and the output voltage (11 Voltage signal), and impresses the signal on the ACR1 103-1. The ACR1 103-1 forms a control signal for controlling a detected current of the current detecting circuit 16 (16 Current) to match with the current command value 102-S, thereby forming a driving signal for the switching element 13 (13 Driving signal) through PWM 1 103-2. The OSC 104 determines the frequency of 13 Driving signal. The charging control 105-3 forms a driving signal for the main circuit 31 (31 Driving signal) controlling so that current of the main circuit 31 (32 Current) and voltage of the battery 4 (4 Voltage) charge the battery 4 with constant current charging or constant voltage charging determined by prescribed values Iref2 and Vref2. 31 Driving signal charges the battery 4. Output voltage and output current flowing to the load of the AC/DC converter 1 (not including charging current for the battery 4) of the power supply device 200 are 200 Output voltage and 1 Output current in FIG. 3.

If the signal 101-S is in an area more than the charging control level, and less than the load sharing level (a load state where 200 Output current is from I1 to I2), the charging command 106-S3 becomes off, and the other commands remain unchanged. Since the charging command 106-S3 becomes off, the charging operation of the DC converter 3 stops. Only the AC/DC converter 1 operates and shares the entire load.

If the signal 101-S is in an area more than the load sharing control level (a load state where 200 Output current is from I2), the voltage level detecting circuit 106 provides the current calculating circuit 107 with a load sharing command 106-S1 and the reference signal of current Iref1 corresponding to the load sharing control level. The voltage level detecting circuit 106 also impresses the operation command 106-S2 on the PWM2 105-2. When the current calculating circuit 107 is impressed with the load sharing command 106-S1, it provides the current command circuit 102 with the reference signal Iref1 as the current command value signal 107-S1, and provides the ACR2 105-1 with the difference between the signal 101-S and the reference signal Iref1 as the current command value signal 107-S2. The current command circuit 102 forms a current command value 102-S from the signal 107-S1 and 11 Voltage signal for the AC/DC converter 1, and uses the PFC controlling part 103 to control the output current of the AC/DC converter 1 to the reference signal Iref1. The ACR2 105-1 and the PWM 2 105-2 control the DC converter 3 so that the output current 32 of the DC converter 3 is a differential signal 107-S2 corresponding to a portion exceeding the reference signal Iref1. The AC/DC converter 1 and the DC converter 3 operate in parallel such that the output current of the AC/DC converter 1 becomes the reference signal Iref1, the DC converter 3 shares the excessive portion, thereby making 200 Output voltage to a prescribed value.

The voltage level detecting circuit 106 monitors 11 Voltage signal, and impresses the load sharing command 106-S1 and a reference signal of 0 level Iref 1 on the current calculating circuit 107 when the AC input is interrupted. The voltage level detecting circuit 106 also sets the charging command 106-S3 impressed on the charging control 105-3 to off, sets the operation command 106-S4 impressed on the PWM1 103-2 to off, and stops the charging operation for the battery 4 and the operation of the AC/DC converter 1. The current calculating circuit 107 provides 107-S2 corresponding to 101-S, controls the DC converter 3 such that the output current 32 corresponds to 101-S, thereby using the DC converter 3 as back up in case of a power interruption of the AC input.

The power supply device in FIG. 1 constituted with the control circuit 100 in FIG. 2 serves as a power supply device providing stable DC power while the AC/DC converter 1 and the DC converter 3 supply the input to the DC/DC converter 2 in parallel, thereby realizing a power supply device which increases the reliability, and reduces the size and the cost, and increases the conversion efficiency by eliminating power converting parts with redundant features.

Figure 4:
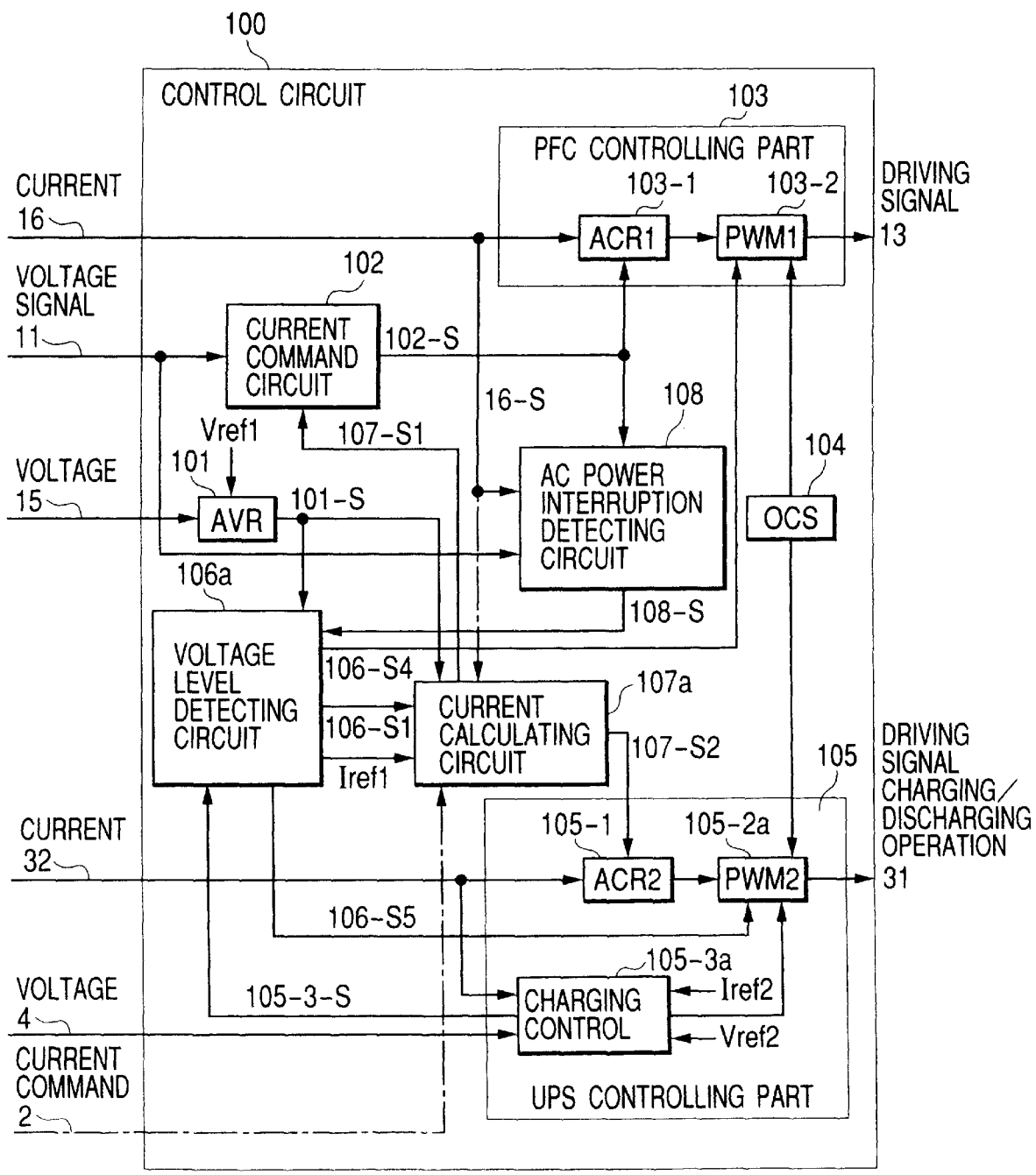
FIG. 4 is a detailed constitution diagram of another control circuit of the present invention.

FIG. 4 shows the detail of an alternative control circuit 100 for the DC power supply device of the present embodiment. In FIG. 4, circuit constituting elements with the same numbers as in FIG. 2 indicate the same constituting elements in FIG. 2. Among elements in FIG. 4, 105-3a substitutes 105-3, 105-2a substitutes 105-2, 106a substitutes 106, and 107a substitutes 107. An AC power interruption detecting circuit 108 is a constitution element newly added.

The charging control 105-3a also manages the charging amount of the battery 4, and has a feature of providing a voltage level detecting circuit 106a with a signal 105-3-S when the battery 4 is not fully charged, and the feature for forming 31 Driving signal for charging is removed from the PWM2 105-2a. The voltage level detecting circuit 106a inhibits the output of the load sharing command 106-S1 and an operation command 106-S5 as a discharging operation signal when the signal 105-3-S is impressed. The voltage level detecting circuit 106a also increases the charging control level and the load sharing level to stop the load sharing operation of the DC converter 3. The operation command 106-S5 is a signal for discriminating the charging command, the operation stop command, and the discharging command as the functions of signals of 106-S3 and 106-S2 in FIG. 2 serve. The PWM2 105-2a uses the signal impressed by the charging control 105-3a to form 31 Driving signal when 106-S5 is the charging command. The PWM2 105-2a stops 31 Driving signal when 106-S5 is the operation stop command, and uses the signal impressed by the ACR2 105-1 to form 31 Driving signal when 106-S5 is the discharging signal. The AC power interruption detecting circuit 108 uses both a power interruption detection of the AC input by monitoring 11 wvoltage signal, and a power interruption detection by comparing the current command 102-S of the AC/DC converter 1, and the actual detected current 16-S to detect a power interruption of the AC input. This power interruption detection is conducted at a high speed, and a power interruption signal 108-S is impressed on the voltage level detecting circuit 106a to control as described in FIG. 2 when a power interruption is detected.

Constituting the control circuit 100 in FIG. 4 detects a power interruption more rapidly with the difference between the current command and the actual current, and the comparison of the existence, shares the part forming the driving signal for the DC converter 3, thereby increasing the performance of the power supply, decreasing the size of the control circuit, and increasing the reliability further.

Figure 5:
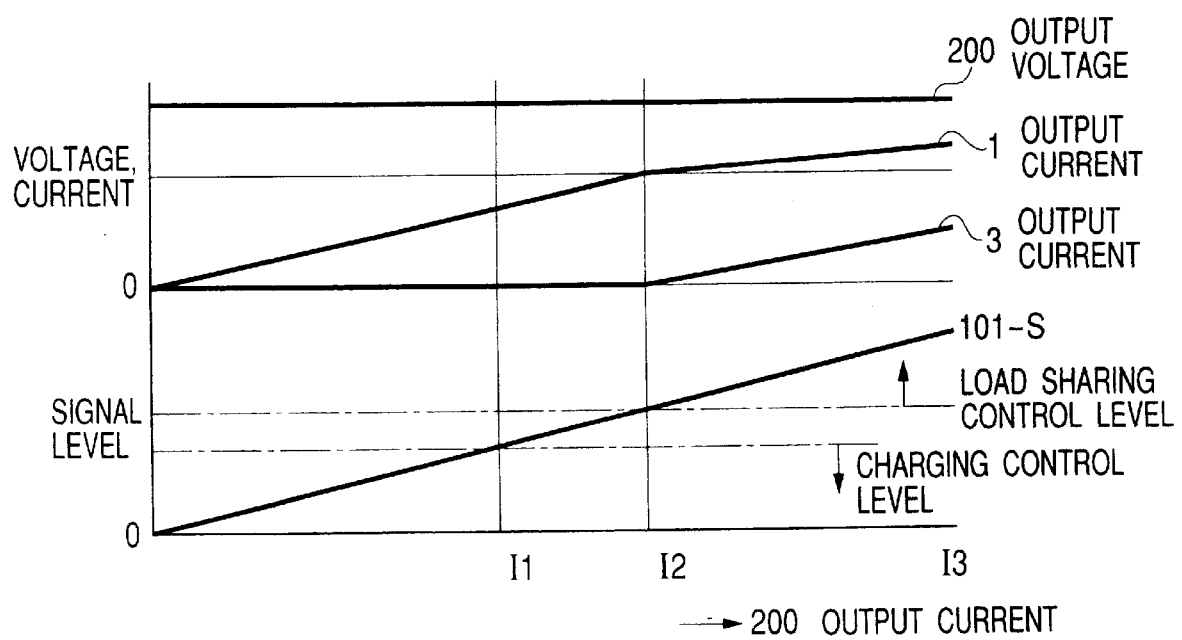
FIG. 5 is a figure showing the operation of another control circuit of the present invention.

Increasing the reference signal Iref 1 provided for the current calculating circuit 107a at a prescribed ratio in the load sharing control period increases the 1 Output current of the AC/DC converter 1 as in FIG. 5, thereby control 3 Output current of the DC converter 3 for sharing at a prescribed ratio in the parallel operation, resulting in a high performance. The same effect is obtained when the reference signal Iref1 provided for the current calculating circuit 107 in FIG. 2 is increased at a prescribed ratio.

2 Current command and 16 current signal 16-S indicated as dash dots are impressed on the current calculating circuit 107a in FIG. 4. 2 Current command is a current command 1 from the DC/DC converter 2, a current command 2 from the load 5, or an upper level current command signal such as a current command from a processing device equivalent to system control. Before a change in the current or the voltage detected by the power supply device 200, controlling the commands 107-Si and 107-S2 according to the upper level current command signal controls the current detecting circuit 107a, the current command circuit 102, and the UPS controlling part 105. Using the upper level current command signal to control before hand sets the AC/DC converter 1 and the DC converter 3 in proper states, resulting in a high performance power supply device responding to a load response at a high speed. Providing the signal 16-S to the current calculating circuit 107a, and comparing it with 2 Current command realizes even higher performance.

Figure 6:
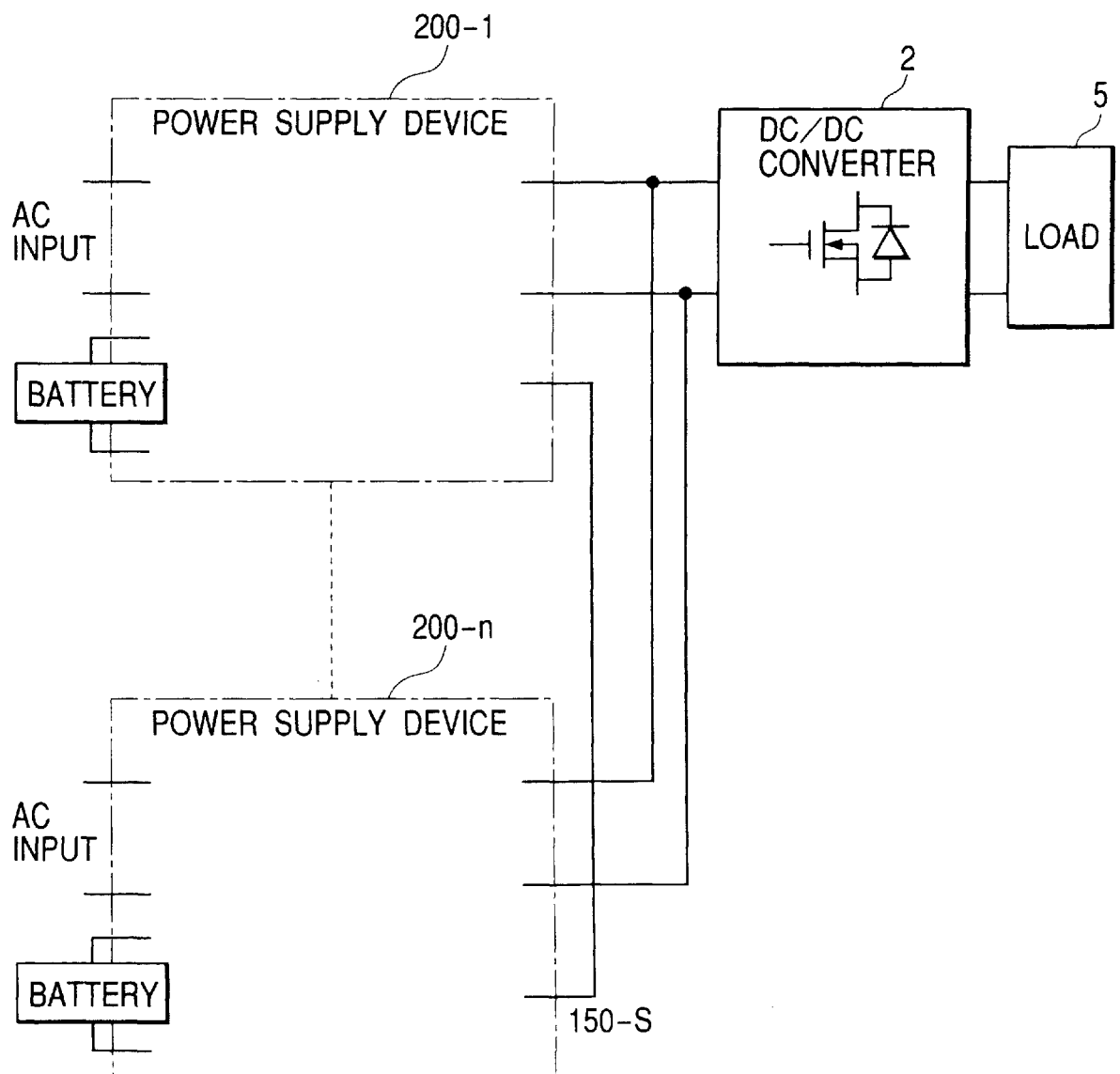
FIG. 6 is a constitution diagram of a DC power supply device of another embodiment of the present invention.

FIG. 6 describes a constitution of a DC power supply device of an alternative embodiment of the present invention. This is a multiplex power supply constitution provided with multiple power supply devices 200 comprising 200-1 to 200-n. As many of the power supply devices as meeting required capacity and application are connected and constituted in parallel. The power supply devices 200-1 to 200-n have a feature for using the control circuit 100 described in FIG. 7 to receive/send the current control signal 150-S, thereby operating in parallel for sharing a load.

Figure 7:
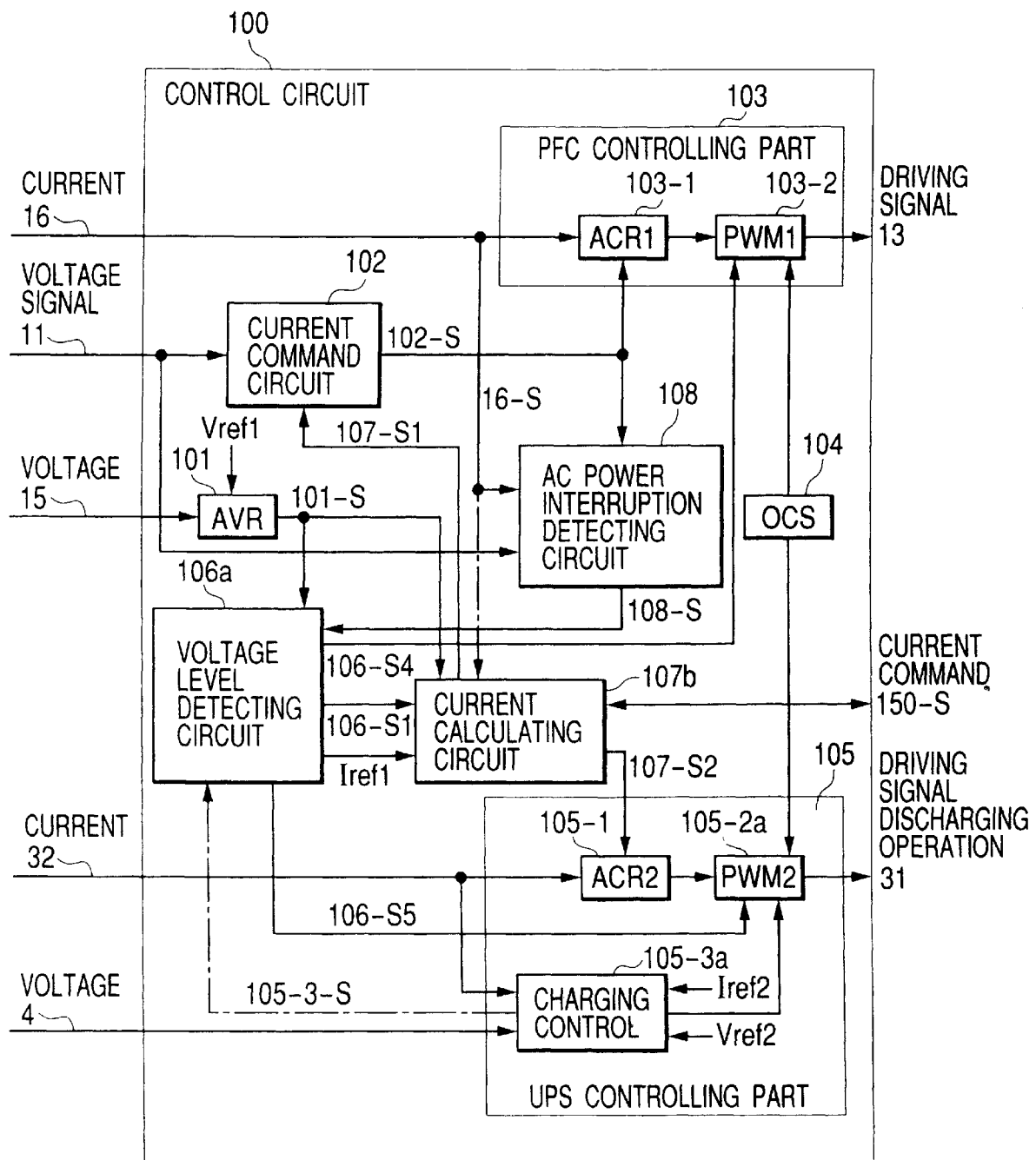
FIG. 7 is a detailed constitution diagram of another embodiment of a control circuit of the present invention.

In FIG. 7, circuit constituting elements with the same numbers as in FIG. 4 indicate the same circuit elements in FIG. 7. In FIG. 7, 107b is a constituting element substituting 107a in FIG. 4. The current calculating circuit 107b has a feature for receiving and sending the current command 150-S, and conducts the load sharing control. Applying a known value such as the maximum or the average of the output current to the current command signal 150-S attains the purpose. The DC/DC converter 2 can be constituted as multiplex circuit, multiple-stage circuit, or combination of the multiplex and the multi-stage circuits. A constitution provided with the battery outside the power supply device is possible. A constitution in FIG. 6 where the power supply devices are multiplexed stably provides the load 5 with power when a multiplexed circuit constituting element fails, and a replacement service is conducted without stopping the other power supply devices or the DC/DC converter 2 for the load when a constitution element is maintained or replaced.

The embodiment in FIG. 6 uses the multiplexing to further increase the reliability, and realizes a constitution including the number of parallel connections according to a required capacity and application.

Figure 8:
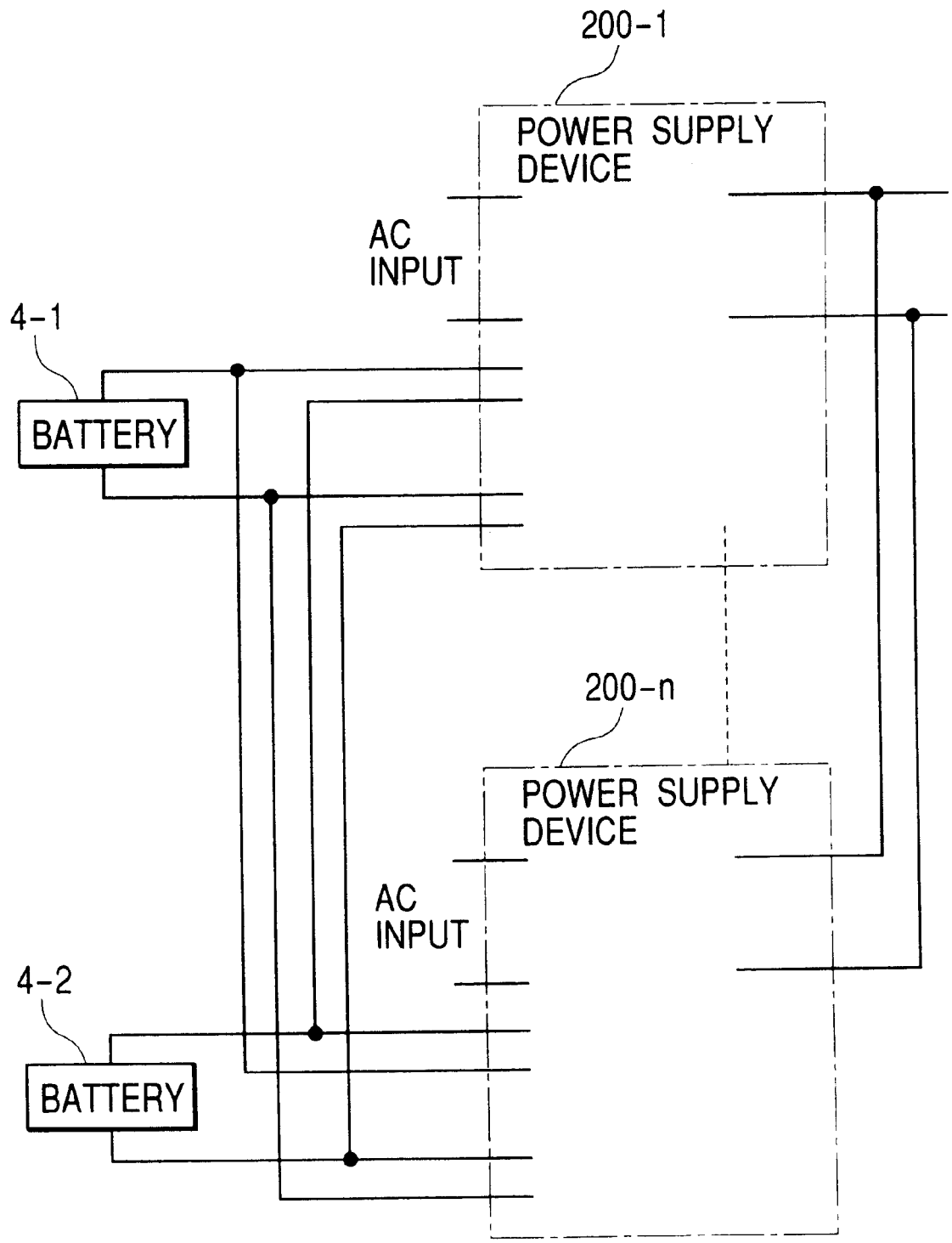
FIG. 8 is a constitution diagram of a DC power supply device of another embodiment of the present invention.

FIG. 8 shows a constitution of a DC power supply device of an alternative embodiment of the present invention. The difference from the FIG. 6 is that two batteries 4-1 and 4-2 common to the power supply devices 200-1 to 200-n are provided. The power supply devices 200-1 to 200-n are connected with the batteries 4-1 and 4-2 through a diode or a switch.

An embodiment shown in FIG. 8 reduces the size and the cost of the power supply device by sharing batteries as well.

Effect of the Invention

As described above, according to the present invention, power is supplied in parallel from a battery through the DC converter when a load is more than a prescribed value, and the DC converter supplies power as a backup when the AC input fails, thereby stably supplying DC power resulting in increasing reliability, and eliminating power converting parts including redundant features resulting in reducing the size and the cost, and increasing the conversion efficiency.

According to the present invention, an AC power interruption is detected at a high speed, and the part for forming the signal for driving the DC converter is shared, thereby increasing the performance of the power supply, and reducing the size of the control circuit, resulting in further increasing the reliability.

Increasing the output current from the AC/DC converter at the prescribed ratio, and operating in parallel with the output current of the DC converter for a shared control at the prescribed ratio increases the performance further.

Before a change in the voltage or the current detected by the power supply device, controlling before hand according to the current command signal from the upper level provides a high performance power supply device reacting to a load response at a high speed.

The present invention allows a constitution multiplexing the power supply devices, thereby stably supplying a load with power when a multiplexed circuit constituting element fails, and a replacement service is conducted without stopping the other power supply devices or the DC/DC converter for a load when a constitution element is maintained or replaced.

What is claimed is:

1. A method of controlling a DC power supply device comprising an AC/DC converter which converts an AC input to DC voltage, a DC/DC converter which converts output power of said AC/DC converter into a load voltage, a DC converter converting DC power from a battery to DC voltage equivalent to the output of said AC/DC converter to connect to output terminals of the AC/DC converter, and a control circuit which controls the output voltage of said AC/DC converter and the output voltage of said DC converter to a prescribed value, said method comprising:

supplying power in parallel from said AC/DC converter and said DC converter when a load is more than a prescribed value; and said DC power supply device supplying power as a backup from said DC converter when a malfunction occurs in the AC power input.

2. The method according to claim 1, wherein:

said control circuit has a voltage control circuit which controls the output voltage of said AC/DC converter to a prescribed value, a current command circuit which forms a current command for said AC/DC converter, a PFC controlling part which controls said AC/DC converter, a UPS controlling part which controls said DC converter to conduct a prescribed operation, a voltage level detecting circuit, and a current calculating circuit;

said control circuit controls said current command circuit, said PFC controlling part, and said UPS controlling part according to outputs from said voltage level detecting circuit; and said current calculating circuit, thereby operating said AC/DC converter and said DC converter.

3. The method according to claim 2, wherein:

said voltage level detecting circuit observes a charging control level and a load sharing level, impresses a charging command on said UPS controlling part, and simultaneously provides said PFC controlling part with a current command when a voltage level is less than said charging control level, stops only said charging command when the voltage level is more than said charging level and less than said load sharing level; and said voltage level detecting circuit provides said UPS controlling part and said PFC controlling part with current commands when the voltage level is more than said load sharing level.

4. The method according to claim 2, wherein said current calculating circuit forms a current command value making said DC converter share a part of a load current corresponding to an excessive amount at least when the load current exceeds a prescribed output current value of said AC/DC converter.

5. The method according to claim 2, wherein said current calculating circuit forms a current command value making said DC converter shares an excessive load current at a prescribed ratio at least when the load current exceeds a prescribed output current value of said AC/DC converter, and a reference current signal which includes at the prescribed ratio provided.

6. The method according to claim 2, wherein:

said DC power supply device further comprises an AC power interruption detecting circuit; and said AC power interruption detecting circuit simultaneously uses a power interruption detection in the AC input, and a power interruption detection by comparing the current command from said AC/DC converter and an actual detected current to detect a power interruption of the AC input, and impresses a power interruption signal on said voltage level detecting circuit when a power interruption is detected.

7. The method according to claim 6, wherein said voltage level detecting circuit inhibits providing a load sharing command and a charging operation command when said battery is insufficiently charged.

8. The method according to claim 6, wherein a driving signal forming circuit of the DC converter included in said UPS controlling part uses a charging command, discharging command, and an operation stop command to form the driving signal.

9. The method according to claim 6, wherein said current calculating circuit, said current command circuit, and said UPS controlling part are controlled according to an upper level current command signal which are impressed on said current calculating circuit by said DC/DC converter, a load or a processing device equivalent to system control before a change in the voltage or the current is detected by the power supply device.

* * * * *